United States Patent [19]

Berg

[11] Patent Number: 4,797,294

[45] Date of Patent: Jan. 10, 1989

[54] CHILLPROOFING WITH MAGNESIUM SILICATE/SILICA GEL AGENTS

[75] Inventor: Kenneth A. Berg, Norristown, Pa.

[73] Assignee: PQ Corporation, Valley Forge, Pa.

[21] Appl. No.: 67,022

[22] Filed: Jun. 29, 1987

[51] Int. Cl.⁴ ............................................. C12H 1/02
[52] U.S. Cl. .............................. 426/330.4; 252/315.6; 423/338; 426/423
[58] Field of Search ...................... 426/330.4, 423, 442, 426/495; 210/502.1, 691, 635; 423/338, 339

[56] References Cited

U.S. PATENT DOCUMENTS

| | | | |
|---|---|---|---|
| 3,163,538 | 12/1964 | Raible | 426/423 |
| 3,436,225 | 4/1969 | Raible | 426/330.4 |
| 3,940,498 | 2/1976 | Butterworth | 426/423 |
| 4,508,742 | 4/1985 | McLaughlin et al. | 426/423 |
| 4,515,821 | 5/1985 | Armstead | 426/330.4 |
| 4,563,441 | 1/1986 | McLaughlin et al. | 423/331 |
| 4,636,394 | 1/1987 | Hsu | 426/330.4 |
| 4,684,530 | 8/1987 | Welsh | 426/330.4 |

Primary Examiner—Donald E. Czaja
Assistant Examiner—Carolyn Paden
Attorney, Agent, or Firm—Ernest G. Posner; J. Stephen Bobb; Fred C. Philpitt

[57] ABSTRACT

Combinations of silica gel and magnesium silicate have been found to be effective agents to prevent the formation of haze in beer. Said haze, often called chill haze, is prevented by contacting the ruh beer with the combination to remove some or all of the components that react to form the haze. The spent combination is removed from the beer in the usual manner.

8 Claims, No Drawings

CHILLPROOFING WITH MAGNESIUM SILICATE/SILICA GEL AGENTS

BACKGROUND OF THE INVENTION

This invention relates to chillproofing beverages such as beer. The invention involves the use of a combination of silica gel and magnesium silicate to remove various colloidal components of ruh beer which form haze upon chilling.

The term "beer" as used in this specification and the claims includes many types of brewed beverages. Such beverages include, but are not limited to, lager, pilsner, Dortmund and Munich beers as well as top fermented beverages such as ale, porter and stout.

Turbidity is an important and at times troublesome aspect encountered in brewing operations. It can be of biological and physicochemical origins. Gross turbidity caused by suspended solids substantially above the colloidal range can be overcome by filtering or other separation methods. Various filter aids called fining agents are used to coagulate such coarse particles. Secondary and more subtle turbidity problems involve the haze which develops on aging and/or chilling the previously filtered beer. This haze is caused by the coagulation of a number of organic materials in the beer. These materials are not removed by the previously described filtration step.

A number of methods have been developed to remove at least some of the chill haze formers in beer. Among these methods are reactin with other organic material to product a filtrable precipitate. A number of adsorbents are also used to remove certain fractions that cause chill haze. Silica hydrogels and xerogels, calcium, aluminum and magnesium silicates, diatomaceous earth, several types of natural minerals and clays and mixtures thereof have been suggested and used as chillproofing agents. U.S. Patents that disclose such art include the following: U.S. Pat. Nos. 3,163,538; 3,251,693; 3,436,225; 3,617,301; 3,940,498 and 3,958,023. These materials and methods have been successful with some beers but less than satisfactory with other beers.

U.S. Pat. Nos. 4,508,742 and 4,563,441 teach and claim a combination of about 5% or less of magnesium silicate with silica hydrogel to treat beer. The hydrogel is used to provide chillproofing while the magnesium silicate is present to avert metal, particularly iron, contamination of the beer.

SUMMARY OF THE INVENTION

I have found that combinations of silica gel and magnesium silicate can provide excellent protection from haze formation, often called chill haze. The superior performance of such combinations require that the magnesium silicate have certain properties and constitute a substantial portion of the combination.

The silica gel and magnesium silicate can be added to the beer separately or they can be combined prior to addition. Contact between the combination and the beer is maintained for a time sufficient for adsorption of the chill haze components. The filtering removes the adsorbents now containing the undesirable material.

While magnesium silicate has been suggested as an adsorbent in the treatment of beer and other liquids, no one has previously found that superior chillproofing can be achieved by carefully selecting the magnesium silicate and by nearly balancing the amount of silica gel and magnesium silicate present in the combination.

THE INVENTION

The major component of my chillproofing combination is a siliceous material capable of sorbing the colloidal fractions in beer that combine to cause haze upon aging and/or chilling. Usually this siliceous material is a silica gel, prepared by adding acid to an alkali metal silicate solution under conditions that produce a hydrosol that completely solidifies upon aging. The properties of such gels are dependent upon the gel conditions, the technique used to dry the gel, and other treatment. Silica gels formed with sufficient acid to at least completely neutralize the alkali in the silicate are designated regular density gels, which tend to have larger surface areas with smaller pores and pore volumes. If not all the alkali is neutralized, intermediate density gels are formed, which tend to have smaller surface areas with larger pores and pore volumes. Drying such gels using ordinary techniques tends to shrink the pores and form what is known as a xerogel. Replacing the water in the pores of the gels with a solvent having a high vapor pressure and flash drying produces an aerogel with pores unaffected by the drying step. The surface area and density of the regular density gel can be altered by heating at various pH values and salt concentrations. Further discussion of gel preparation can be found in Iler, *The Chemistry of Silica*, (Wiley-Interscience, New York: 1979).

A special type of regular density silica gel is especially useful in my combination. This silica is a specially prepared silica hydrogel with a surface area of at least 700 m$^2$/g, a mean pore diameter of 30 to 120Å, an average particle size of 20 microns or less and a loss on ignition of at least 50% by weight. The preparation and properties of this hydrogel are disclosed in U.S. Pat. No. 3,617,301. This patent is hereby incorporated by reference.

Amorphous and porous magnesium silicate is required to provide superior chillproofing performance with silica gel. Such silicates are articles of commerce and can be prepared in a number of ways such as ion exchange of magnesium for the metals of other insoluble silicates; precipitation formed upon the contact of a magnesium salt and a source of silicate ions in aqueous medium; and ion exchange of magnesium ions onto previously prepared precipitated or gelled silica followed by washing, dewatering and drying steps to provide the appropriate silicate. U.S. Pat. Nos. 2,163,525 and 2,163,526 describe ion exchange methods, while U.S. Pat. Nos. 2,241,791 and 2,393,625 describe direct precipitation from a source of silicate and a magnesium salt. U.S. Pat. Nos. 1,999,210 and 2,498,353 also describe methods of preparing useful silicates. Meinhold, et al, "Magnesium Silicate--via Synthetic Route," *Chemical Processing*, June 1960, p. 36, reviews appropriate methods as well. These methods may be employed to prepare magnesium silicates that function to reduce the apparent level of beverage-soluble metals of cominations of the silicate and the chillproofing agents or combinations of the silicate, chillproofing agents and filter aids. Satisfactory materials are available from the Pilot Engineering Division of Reagent Chemical and Research, Inc. I prefer the material to have the properties summarized in Table 1.

TABLE 1

| Properties of Magnesium Silicate | |
| --- | --- |
| Mole Ratio MgO:SiO$_2$ | 1:1.6 to 4.7 |
| Surface Area (M$^2$/g) | 200 to 600 |
| Weight loss 105° C. (wt %) | 5 to 20 |
| Ignition loss (wt %) | 10 to 35 |

The chillproofing combination of my invention must provide at least about 30% but less than 65% magnesium silicate. I prefer 40 to 60% magnesium silicate with 60 to 40% silica gel.

The components can be added to the beer separately, but I prefer that they be added as a blend. The required blending can be done in any manner, but can be accomplished during milling of the hydrogel.

The combination can be contacted with the beer in any convenient manner and removed by any appropriate separation techniques. The level of treatment should be sufficient to remove the chill haze components, usually being between 100 and 2,000 parts per million (ppm) based on the beer. I prefer to use about 200 to b 800 ppm of the combination.

The chillproofing combination of my invention is added to the beverage in any convenient manner. It is maintained in contact for a time sufficient to adsorb the material desired and separated by filtering or centrifuging.

The combination of my invention can also be used with other beer treating agents such as filter aids and polyvinylpolypyrrolidone, when desired.

EXAMPLES

The following examples illustrate certain embodiments of my invention. They should not be considered as establishing the scope of the invention. The scope is defined in the disclosure and recited in the claims. The proportions are in parts by weight (pbw), percent by weight (% w/w), and parts per million (ppm) unless otherwise indicated.

The chill haze prevention was measured in a laboratory simulation of chill haze formation. This simulation is a modification of a forcing test reported by K. Asano, K. Shinagawa and H. Hashimoto, "Characterization of Haze-Forming Proteins and Their Roles in Chill-Haze Formation" presented at the 48th Annual Meeting of the American Society of Brewing Chemists at Kansas City, Mo., in May, 1982. Crude beer proteins were obtained by ammonium sulfate precipitation (100% saturation) from unchillproofed beer. Fifteen pbw of said protein dispersion was mixed with 15 pbw of a solution of (±) catechin (800 mg/L) in a sealed vessel. The mixtures were heated at 100 ® C. for 20 minutes. The chillproofing combinations were added in various dosages after the test material had been cooled to room temperature. Contact was maintained for 5 minutes prior to filtration. The filtrate was then chilled to 0° C. for 40 minutes and haze formation was measured in nephelometer turbidity units (NTU) corrected for blank values. In these examples, some dosages were used that are much higher than those required for chillproofing. Such dosages are presented to more fully illustrate the performance of the various compositions.

The magnesium silicate was Magnesol* 30/40 which has 1.0 mole of MgO for each 2.6 moles of SiO$_2$, a loss at 105° C. of 14%, and a surface area of 12 m$^2$/g. The silica gel had a surface area of 800 m$^2$/g, loss on ignition of 66.5% and a mean pore diameter of 87Å.

*Magnesol is a registered trademark of Reagent Chemical Company.

EXAMPLE 1

The treatment was carried out as described at high dosages (16,700 ppm) to show the effect of the amount of magnesium silicate present. The results are summarized in the following table.

TABLE 2

| Chillproofing Combination | | |
| --- | --- | --- |
| Silica Gel (%) | Magnesium Silicate (%) | Haze NTU |
| None | None | 53 |
| 100 | — | 16 |
| 95 | 5 | 13 |
| 85 | 15 | 12 |
| 65 | 35 | 8 |
| 45 | 55 | 5 |

These results show that combination requires a considerable amount of magnesium silicate to provide superior results.

EXAMPLE 2

A second set of tests was carried out as described in Example 1 to see the effect of adding more magnesium silicate.

TABLE 3

| Chillproofing Combination | | |
| --- | --- | --- |
| Silica Gel (%) | Magnesium Silicate (%) | Haze NTU |
| None | — | 53.0 |
| 100 | — | 24.0 |
| 75 | 25 | 7.7 |
| 55 | 45 | 7.3 |
| 35 | 65 | 10.0 |

These results indicate that if the amount of magnesium silicate is too high, the performance is not as good.

EXAMPLE 3

Testing was carried out at varying dosages to provide further evidence of the improved performance of the composition of my invention.

TABLE 4

| Composition | Dosage (ppm) | Haze NTU |
| --- | --- | --- |
| 100% Silica Hydrogel | 5,000 | 8 |
| 55% Silica Hydrogel/45% Magnesium Silicate | 2,000 | 6 |
| 55% Silica Hydrogel/45% Magnesium Silicate | 5,000 | 5 |
| 55% Silica Hydrogel/45% Magnesium Silicate | 10,000 | 4 |

These results indicate better performance than the silica hydrogel (known to be acceptable to the brewing industry), even when used at lower dosages.

EXAMPLE 4

A comparison test was carried out between silica hydrogel and a gel-magnesium silicate combination as taught by U.S. Pat. Nos. 4,508,742 and 4,563,441. The dosage was 2000 ppm and the silica gel treated sample had a haze reading of 39 NTU. The combination contained 98% hydrogel and 2% magnesium silicate, and at 2000 ppm produced a sample with a haze reading of 38 NTU. These results indicate that combinations taught by '742 and '441 do not result in improved chillproofing.

We claim:

1. A composition for treating beer to prevent chill haze consisting of 30 to 60% magnesium silicate and 60 to 70% silica gel wherein the magnesium silicate has the following properties:
   Mole Ratio $MgO:SiO_2$: 1:1.6 to 4.7,
   Surface Area ($M^2/g$): 200 to 600,
   Weight loss 105° C. (wt %): 5 to 20,
   Ignition loss (wt %): 10 to 35.

2. The composition of claim 1 wherein the silica gel is a regular density hydrogel or an intermediate density xerogel.

3. The composition of claim 1 wherein the silica gel is a hydrogel having a surface area of at least 700 $m^2/g$, a mean pore diameter of 30 to 120Å, an average particle size of 20 microns or less, and a loss on ignition of at least 50 percent by weight (% w/w).

4. A method of treating beer to prevent chill haze comprising the steps of:
   a. contacting said beer with a sufficient amount of a combination of magnesium silicate and silica gel to remove chill haze components, said combination being 30 to 60% magnesium silicate and 70 to 40% silica gel;
   b. maintaining said contact for a time sufficient to absorb the chill haze component; and
   c. separating the combination from the beer.

5. The method of claim 4 wherein the beer is contacted with 100 to 2000 parts per million (ppm) of the combination of magnesium silicate and silica gel.

6. The method of claim 4 wherein the silica gel is a regular density hydrogel or an intermediate density xerogel.

7. The method of claim 5 wherein the silica gel is a regular density hydrogel or an intermediate density xerogel.

8. The method of claim 4 wherein the silica gel is a hydrogel having a surface area of at least 700 $m^2/g$, a mean pore diameter of 30 to 120Å, an average particle size of 20 microns or less and a loss on ignition of at least 50 percent by weight (% w/w).

* * * * *